(12) United States Patent
Feng et al.

(10) Patent No.: US 8,772,994 B2
(45) Date of Patent: Jul. 8, 2014

(54) PERMANENT-MAGNET (PM) ROTORS AND SYSTEMS

(75) Inventors: Xueqing Feng, Austin, TX (US); Lijun Liu, Hangzhou (CN)

(73) Assignee: Teco-Westinghouse Motor Company, Round Rock, TX (US)

( * ) Notice: Subject to any disclaimer, the term of this patent is extended or adjusted under 35 U.S.C. 154(b) by 0 days.

(21) Appl. No.: 12/550,147

(22) Filed: Aug. 28, 2009

(65) Prior Publication Data

US 2010/0052455 A1 Mar. 4, 2010

(30) Foreign Application Priority Data

Aug. 28, 2008 (CN) .......................... 2008 2 016707 U (51) Int. Cl.
*H02K 21/14* (2006.01)
*H02K 1/22* (2006.01)
*H02K 1/32* (2006.01)

(52) U.S. Cl.
CPC . *H02K 1/223* (2013.01); *H02K 1/32* (2013.01)
USPC .................. 310/156.57; 310/156.53

(58) Field of Classification Search
USPC .......... 310/156.53–156.57, 216.055, 216.106
See application file for complete search history.

(56) References Cited

U.S. PATENT DOCUMENTS

| | | | |
|---|---|---|---|
| 2,418,980 A | 4/1947 | Morrill | 310/156.76 |
| 3,492,520 A | 1/1970 | Yates | 310/156.79 |
| 3,710,156 A | 1/1973 | Laing | 310/54 |
| 4,060,745 A | 11/1977 | Linscott, Jr. | 310/156.22 |
| 4,127,786 A | 11/1978 | Volkrodt | 310/156.84 |
| 4,139,790 A | 2/1979 | Steen | 310/156.83 |
| 4,139,990 A | 2/1979 | Barnes | 62/5 |
| 4,144,469 A | 3/1979 | Miyashita et al. | 310/156.28 |
| 4,309,635 A | 1/1982 | Sei et al. | 310/211 |
| 4,322,648 A | 3/1982 | Ray et al. | 310/156.55 |
| 4,358,696 A | 11/1982 | Liu et al. | 310/156.56 |
| 4,403,161 A | 9/1983 | Miyashita et al. | 310/156.83 |
| 4,405,873 A | 9/1983 | Nondahl | 310/156.56 |
| 4,454,438 A | 6/1984 | Yamashita et al. | 310/162 |
| 4,486,679 A | 12/1984 | Jones | 310/407 |
| 4,502,752 A | 3/1985 | Montagu | 359/199.1 |
| 4,506,181 A | 3/1985 | Jones et al. | 310/156.78 |
| 4,516,046 A | 5/1985 | Mercier | 310/154.11 |
| 4,559,463 A | 12/1985 | Kobayashi | 310/156.53 |
| 4,568,846 A | 2/1986 | Kapadia | 310/156.83 |
| 4,599,530 A | 7/1986 | Laing | 310/90 |

(Continued)

FOREIGN PATENT DOCUMENTS

CN 1717853 1/2006
DE 102 54 967 6/2004

(Continued)

OTHER PUBLICATIONS

Tarimer and Ocak, "Performance comparison of internal and external rotor structured wind generators mounted from same permanent magnets on same geometry," *Electronics and Electrical Engineering*, pp. 65-70, 2009.

*Primary Examiner* — Tran Nguyen
(74) *Attorney, Agent, or Firm* — Fulbright & Jaworski, LLP (57) ABSTRACT

Permanent-magnet (PM) rotors, rotor components, and machines using PM rotors, where the PM rotors have internally coupled PM bulks and/or are configured to have a non-uniform air gap between the rotor and a stator.

16 Claims, 6 Drawing Sheets

(56) References Cited

U.S. PATENT DOCUMENTS

| | | | |
|---|---|---|---|
| 4,620,120 A | 10/1986 | Laing | 310/166 |
| 4,760,300 A | 7/1988 | Yoshida et al. | 310/211 |
| 4,845,837 A | 7/1989 | Lloyd | 29/598 |
| 4,883,999 A | 11/1989 | Hendershot | 310/216.071 |
| 4,922,152 A | 5/1990 | Gleghorn et al. | 310/156.84 |
| 5,013,951 A | 5/1991 | Stadnik et al. | 310/156.07 |
| 5,097,166 A | 3/1992 | Mikulic | 310/156.83 |
| 5,155,404 A | 10/1992 | Sadarangani | 310/211 |
| 5,159,220 A | 10/1992 | Kliman | 310/156.56 |
| 5,162,685 A | 11/1992 | Yamaguchi et al. | 310/156.28 |
| 5,402,026 A | 3/1995 | Gertmar et al. | 310/182 |
| 5,444,319 A | 8/1995 | Nakamura et al. | 310/211 |
| 5,548,172 A | 8/1996 | Kliman et al. | 310/156.53 |
| 5,729,885 A | 3/1998 | Carosa et al. | 29/598 |
| 5,731,647 A | 3/1998 | Schuller et al. | 310/114 |
| 5,818,139 A | 10/1998 | Yamagiwa et al. | 310/156.45 |
| 5,889,342 A * | 3/1999 | Hasebe et al. | 310/54 |
| 5,952,757 A | 9/1999 | Boyd, Jr. | 310/156.81 |
| 5,952,764 A | 9/1999 | Nakamura et al. | 310/216.004 |
| 5,982,070 A * | 11/1999 | Caamano | 310/216.047 |
| 6,049,153 A * | 4/2000 | Nishiyama et al. | 310/216.009 |
| 6,088,906 A | 7/2000 | Hsu et al. | 310/211 |
| 6,147,428 A * | 11/2000 | Takezawa et al. | 310/156.57 |
| 6,268,677 B1 | 7/2001 | Takabatake et al. | 310/156.55 |
| 6,603,232 B2 | 8/2003 | Van Dine et al. | 310/156.01 |
| 6,624,538 B2 | 9/2003 | Janisiewicz et al. | 310/12.25 |
| 6,664,688 B2 | 12/2003 | Naito et al. | 310/156.01 |
| 6,703,744 B2 * | 3/2004 | Yoshinaga et al. | 310/156.45 |
| 6,727,624 B2 | 4/2004 | Morita et al. | 310/156.78 |
| 6,727,627 B1 | 4/2004 | Sasaki et al. | 310/211 |
| 6,798,104 B2 * | 9/2004 | Kajiura et al. | 310/162 |
| 6,844,652 B1 | 1/2005 | Chu et al. | 310/216.097 |
| 6,853,106 B2 | 2/2005 | Fujiwara et al. | 310/184 |
| 6,867,527 B2 | 3/2005 | Moore | 310/211 |
| 6,876,119 B2 | 4/2005 | Sasaki et al. | 310/211 |
| 6,891,298 B2 * | 5/2005 | Gary | 310/156.53 |
| 6,891,300 B2 | 5/2005 | Noda et al. | 310/156.78 |
| 6,919,663 B2 * | 7/2005 | Iles-Klumpner | 310/156.53 |
| 6,940,199 B2 | 9/2005 | Imamura et al. | 310/156.48 |
| 6,946,766 B2 * | 9/2005 | Gary et al. | 310/156.53 |
| 7,019,427 B2 | 3/2006 | Sasaki et al. | 310/156.78 |
| 7,030,530 B2 | 4/2006 | Malmberg | 310/156.28 |
| 7,038,345 B2 | 5/2006 | Fratta | 310/156.53 |
| 7,042,127 B2 * | 5/2006 | Tsuruta et al. | 310/156.53 |
| 7,102,259 B2 | 9/2006 | Kawaguchi et al. | 310/61 |
| 7,102,264 B2 | 9/2006 | Yanashima et al. | 310/156.57 |
| 7,183,686 B2 | 2/2007 | Sasaki et al. | 310/156.78 |
| 7,233,090 B2 * | 6/2007 | Evans et al. | 310/156.57 |
| 7,247,965 B2 | 7/2007 | Weihrauch | 310/156.78 |
| 7,365,466 B2 | 4/2008 | Weihrauch et al. | 310/156.78 |
| 7,372,183 B2 | 5/2008 | Sasaki et al. | 310/156.78 |
| 7,466,054 B2 | 12/2008 | Watson et al. | 310/156.08 |
| 7,548,006 B2 | 6/2009 | Yu | 310/156.12 |
| 7,560,842 B2 | 7/2009 | Hattori | 310/156.53 |
| 2002/0117923 A1 * | 8/2002 | Takei | 310/156.11 |
| 2002/0171309 A1 * | 11/2002 | Wakui et al. | 310/156.48 |
| 2003/0080640 A1 | 5/2003 | Weiglhofer et al. | 310/156.12 |
| 2004/0256940 A1 * | 12/2004 | Tsuruta et al. | 310/156.53 |
| 2007/0018522 A1 * | 1/2007 | Ackva et al. | 310/156.46 |
| 2007/0052313 A1 | 3/2007 | Takahashi et al. | 310/156.53 |
| 2007/0103024 A1 | 5/2007 | Nakayama et al. | 310/156.53 |
| 2007/0138893 A1 | 6/2007 | Son | 310/156.83 |
| 2007/0138894 A1 | 6/2007 | Shin | 310/156.83 |
| 2007/0228858 A1 | 10/2007 | Malmberg | 310/156.01 |
| 2008/0093944 A1 | 4/2008 | Takahashi et al. | 310/156.02 |
| 2008/0197737 A1 | 8/2008 | Poulin et al. | 310/156.08 |
| 2008/0224558 A1 * | 9/2008 | Ionel | 310/156.57 |
| 2008/0258573 A1 | 10/2008 | Kamiya | 310/156.02 |
| 2008/0265706 A1 | 10/2008 | Nakayama et al. | 310/156.53 |
| 2008/0272667 A1 | 11/2008 | Ionel et al. | 310/156.83 |
| 2009/0026865 A1 * | 1/2009 | Aota et al. | 310/156.01 |
| 2009/0091200 A1 | 4/2009 | Weihrauch | 310/61 |
| 2009/0115280 A1 | 5/2009 | Nakayama et al. | 310/156.53 |
| 2009/0140593 A1 | 6/2009 | Kaiser et al. | 310/156.53 |
| 2010/0117477 A1 * | 5/2010 | Yoshino et al. | 310/156.53 |
| 2010/0119390 A1 * | 5/2010 | Baba et al. | 417/423.7 |

FOREIGN PATENT DOCUMENTS

| | | | | |
|---|---|---|---|---|
| DE | 103 57 230 | | 3/2005 | |
| JP | 2001 025189 | | 1/2001 | |
| WO | WO 2007/025180 | | 3/2007 | |
| WO | WO 2007/073086 | | 6/2007 | |
| WO | WO 2008102439 A1 * | 8/2008 | | 310/156.53 |
| WO | WO 2008105049 A1 * | 9/2008 | | 310/156.53 |

* cited by examiner

PERMANENT-MAGNET (PM) ROTORS AND SYSTEMS

RELATED APPLICATIONS

This application claims benefit under 35 U.S.C. §119(a) to Chinese utility model registration No. 200820163707.4, filed on Aug. 28, 2008, which is incorporated by reference.

BACKGROUND

1. Field of the Invention

The present invention relates generally to rotors and electrical machines using rotors, and, more particularly, but not by way of limitation, to permanent-magnet (PM) rotors, rotor components, and machines comprising PM rotors.

2. Description of Related Art

Rotors and machines using rotors have been known in the art for some time. For example, electrical machines such as motors traditionally include brushes and a rotor with wire windings. Such traditional winding-based rotors are relatively inefficient compared with PM rotors, and PM rotors may generally be made smaller than traditional winding-based rotors for a given capacity or output. As a result, machines using PM rotors may generally be made smaller than those with traditional winding-based rotors. PM rotors generally use permanent magnet material instead of traditional electrical wire windings, such that a PM rotor machine does not require reactive current from a power supply. As such, power consumption of PM machines can generally be reduced relative to those using traditional winding-based rotors for a given output. For example, some PM rotor machines can achieve a higher power factor, higher power density, and higher efficiency (e.g., 25% to 120% of the rated load), relative to a traditional winding-based machine. Maintenance costs of PM machines may also be reduced, as the simpler configuration (e.g., without windings, brushes, etc.) may result in fewer parts or points of potential failure.

PM electric motors, which are widely used at present in daily life, industrial and agricultural production, aviation and aeronautics, national defense, and various like fields, are generally of one of the following types: PM synchronous generators, PM DC motors, PM motors with asynchronous start-up, variable speed PM synchronous motors, and other PM motors having special uses. Variable speed PM synchronous motors can generally start and stop fast, operate at variable speeds, and perform high-speed tracking under relatively easy modes of control. Moreover, through appropriate design of such motors, the harmonic torque generated by the interaction of stator current and rotor magnets, and the cogging torque generated by the interaction of the stator core and rotor magnets, can be reduced, allowing the motor when operating at low speed to maintain a low speed ripple and high positional accuracy. Hence these motors are widely used in the field of industrial-control servos.

Variable speed PM synchronous motor may be divided into two general types: square-wave PM synchronous motors (also known as the "brushless DC motor" or "BDCM") and sine-wave PM synchronous motors or "PMSM". With respect to motor structure, the stator armature winding of BDCMs is generally a 60-degree phase-belt concentrated full-pitch winding. Stator winding of PMSMs is generally similar to an ordinary Y-series asynchronous motor, for which distributed winding may be used, and can be full-pitch or short-pitch. In both types of motor, permanent magnets or interior permanent magnets are installed on the rotor. In contrast to asynchronous electric motors, stator current flux can be reduced by the presence of the permanent magnets, and stator copper loss can thereby also be reduced. There is generally no copper loss on the rotors because the sides of the rotors are free of the aluminum bars which distinguish squirrel-cage inductance motors, and hence efficiency is generally improved. Heat generated by the motor may also be reduced, which can be very important for high-precision servo systems. In addition, variable speed PM synchronous motors generally have greater power density, wider speed-adjustment range, and larger torque/current ratio than typical asynchronous electric motors. One field of use is in servo applications, in which electric motors with compact structure, small size, and broad speed-adjustment ranges are sought.

When a variable speed PM synchronous motor is used as an actuator in a digitally controlled servo system, its rotational speed pulsation is generally also required to be as small as possible; that is, the motor's pulsating torque is required to be as small as possible. The pulsating torque of a variable speed PM synchronous motor primarily refers to cogging torque and torque ripple. In terms of characteristics, there is often little or no difference between the cogging torque of a BDCM and that of a PMSM; both are generally pulsating torques that may be generated as a result of the presence of stator teeth, and both typically have the character of reluctance torque that may be the result of the effects of permanent magnets on the stator core. This may be related to rotor position and often changes as the rotor rotates; e.g., it is a spatial function of an electric motor. Methods for weakening and eliminating cogging torque are often similar for both kinds of motors: for example, using skewed stator slots or skewed rotor poles or choosing an appropriate pole-arc coefficient. The goal is usually to keep the apparent magnetic resistance of the rotor constant from beginning to end, even when the rotor is rotating. In general, by skewing a stator slot or a permanent magnet by the distance of one tooth, it may be possible to reduce cogging torque to less than 2% of its set value. Thus, there is generally no significant difference between the cogging torques of BDCM's and PMSM's.

Torque ripple is somewhat unrelated to cogging torque inasmuch as the two are generated by different causes. Torque ripple is typically a result of the interaction between stator current and flux in the magnetic field of the permanent magnets. Both for a BDCM and for a PMSM, whenever the stator current deviates from the ideal wave form, torque ripple may be caused. By means of current control, it is generally possible to ensure that the current feeding a PMSM is sinusoidal, but it is often impossible to ensure that the current feeding a BDCM is square-wave current. This is so because the electrical inductance of a BDCM generally prevents stator phase current from undertaking sudden fluctuations, with the result that the current's actual wave-form is generally trapezoidal. These deviations in current wave-form can cause BDCM torque to exhibit large phase-change ripples, while in PMSM's these ripples are usually fairly small. In high-speed operation, it is possible for these torque ripples to be filtered out by rotor inertia. But in low-speed operation, these torque ripples can negatively affect servo system performance. Thus, BDCM's can be used in speed servo systems and position servo systems that do not have very high performance requirements, but PMSM's may function better in high-performance speed servo systems and position servo systems. In addition to the foregoing characteristics, PMSM's have gained popularity and functionality with the development of electrical and electronic technology, microelectronics, and computer technology, especially since the popularization in the electric motor speed-control field of the concept of using vector control for alternating current motors (which was proposed by German scholars Blaschke and Hases in the 1970's). Nevertheless, PMSM's often have better dynamic properties and better tracking properties, and PMSM's are widely used in high-precision servo systems.

In some known PM rotor configurations, PM bulks are internally coupled to the rotor (e.g., are coupled to the rotor within the external perimeter of the rotor core. One example of such a PM rotor may be referred to as a radial-magnet rotor configuration, in which the magnetizing direction of the PM bulks is aligned with the radial direction of the rotor (e.g., along a line extending from the axis of rotation outward). The challenge for this rotor configuration is that the magnetic-insulation bridges between adjacent PM bulks must be large enough to avoid mechanical damage (e.g., resist mechanical stresses) during high-speed rotation of the rotor. But if the magnetic insulation bridge is large, the magnetic insulation provided between two poles (N and S poles) may be insufficient to effectively limit flux leakage between the poles. This flux leakage may lead to reduced performance of the rotor such that larger PM bulks may be required to achieve suitable functional characteristics.

Another example of such a rotor may be referred to as a tangential-magnet rotor configuration, in which the magnetizing direction of the PM bulks is aligned tangentially to the outer perimeter of the rotor core (e.g., perpendicular to a radial axis extending from the axis of rotation through a point on the external perimeter of the rotor). The challenge for this rotor configuration is that there may be insufficient space in the rotor core to install PM bulks due to the limit of the rotor radius. As such, this configuration may require a larger rotor core (e.g., with a larger radius). The larger size can result in additional material requirements and higher costs. Further, in such a configuration, d-axis and q-axis inductances are generally not symmetrical, and complex control configurations may be required to achieve suitable functional characteristics.

SUMMARY OF THE INVENTION

The present disclosure includes various embodiments of PM rotors, rotor components, and machines comprising PM rotors.

Embodiments of the present PM rotors include radial-magnet configurations, and/or rotors with magnetic insulation bridges configured to provide mechanical strength and suitable magnetic insulation properties, and/or magnetically insulating open spaces between the PM bulks and the magnetic insulation brides, and/or outer perimeters configured to provide a non-uniform air gap between the outer perimeter of the rotor and the inner perimeter of a stator within which the rotor can be used. Embodiments of the present rotors can be configured such that in operation, the air gap-flux density waveform is relatively more sinusoidal (e.g., compared to prior rotors), and/or such that harmonics are suppressed to improve performance. Flux leakage can also be reduced with relatively smaller magnetic-insulation bridges (e.g., compared to prior rotors) and/or non-magnetic open spaces between the magnetic insulation bridges and adjacent PM bulks. Embodiments of the present PM rotors are configured to reduce harmonics torque and losses. Embodiments of the present PM rotors can also be configured to improve efficiency and power factor, and/or to reduce or minimize demagnetizing in the PM bulks. Additionally, embodiments of the present rotors can be configured to create a non-symmetrical magnetic circuit and/or to improve control of flux-weakening such that power density and over-load capabilities can be improved.

Some embodiments of the present permanent-magnet (PM) rotors comprise: a rotor core having an axis of rotation and defining a plurality of openings through at least a portion of the rotor core; and six or more PM bulks internally coupled to the rotor core at equiangular intervals around the axis of rotation such that each PM bulk is disposed within a different one of the openings; where the openings are configured to include open spaces at opposing ends of each PM bulk, the open spaces having a width that is larger than the thickness of the PM bulk and each extending around an opposing end of a PM bulk to terminate between the PM bulk and the outer perimeter of the rotor core; and where the rotor core is configured to have a plurality of magnetic insulation bridges each disposed between adjacent openings and each having a pair of non-parallel opposing sides that partially define adjacent openings.

In some embodiments, the opposing sides of each magnetic insulation bridge are angled such that if projected they would intersect at a point outside the outer perimeter of the rotor core. In some embodiments, if projected the opposing sides would intersect at a point on a q-axis that extends perpendicularly from the axis of rotation through a midpoint between two adjacent PM bulks.

In some embodiments, the opposing sides of each magnetic insulation bridge are angled such that if projected they would intersect at a point inside the outer perimeter of the rotor core. In some embodiments, if projected the opposing sides would intersect at a point on a q-axis that extends perpendicularly from the axis of rotation through a midpoint between two adjacent PM bulks.

In some embodiments, the rotor is configured to be rotatably coupled to a stator having an inner perimeter such that the air gap between the outer perimeter of the rotor core and the inner perimeter of the stator is non-uniform. In some embodiments, a q-axis extends perpendicularly from the axis of rotation through a midpoint between two adjacent PM bulks, a d-axis extends perpendicularly from the axis of rotation through a midpoint of a PM bulk, and the rotor is configured to be rotatably coupled to the stator such that the air gap along the q-axis is between 150 and 250 percent of the air gap along the d-axis. In some embodiments, the rotor is configured to be rotatably coupled to the stator such that the air gap along the q-axis is between 190 and 210 percent of the air gap along the d-axis.

Some embodiments of the present permanent-magnet (PM) rotors comprise: a rotor core having an axis of rotation and an outer perimeter, the rotor core defining a plurality of openings between the axis of rotation and the outer perimeter; and six or more PM bulks internally coupled to the rotor core at equiangular intervals around the axis of rotation such that each PM bulk is disposed within a different one of the openings; where the openings are configured to include non-magnetic flux barriers at opposing ends of each PM bulk, the non-magnetic flux barriers each extending around an opposing end of a PM bulk to terminate at a point between the PM bulk and the outer perimeter of the rotor core such that the radial distance from the flux barrier to the outer perimeter is greater at the termination point than at the end of the PM bulk.

In some embodiments, the rotor core is configured to have a plurality of magnetic insulation bridges each disposed between adjacent openings and each having a pair of non-parallel opposing sides that partially define adjacent openings.

In some embodiments, the opposing sides of each magnetic insulation bridge are angled such that if projected they would intersect at a point outside the outer perimeter of the rotor core. In some embodiments, if projected the opposing sides would intersect at a point on a q-axis that extends perpendicularly from the axis of rotation through a midpoint between two adjacent PM bulks.

In some embodiments, the opposing sides of each magnetic insulation bridge are angled such that if projected they would intersect at a point inside the outer perimeter of the rotor core. In some embodiments, if projected the opposing sides would intersect at a point on a q-axis that extends perpendicularly from the axis of rotation through a midpoint between two adjacent PM bulks.

In some embodiments, the rotor is configured to be rotatably coupled to a stator having an inner perimeter such that the air gap between the outer perimeter of the rotor core and the inner perimeter of the stator is non-uniform. In some embodiments, a q-axis extends perpendicularly from the axis of rotation through a midpoint between two adjacent PM bulks, a d-axis extends perpendicularly from the axis of rotation through a midpoint of a PM bulk, and the rotor is configured to be rotatably coupled to the stator such that the air gap along the q-axis is between 150 and 250 percent of the air gap along the d-axis. In some embodiments, the rotor is configured to be rotatably coupled to the stator such that the air gap along the q-axis is between 190 and 210 percent of the air gap along the d-axis.

Some embodiments of the present rotating machines comprise: a rotor having an axis of rotation and an outer perimeter; and six or more PM bulks internally coupled to the rotor at equiangular intervals around the axis of rotation; a stator in which the rotor is positioned, the stator having an inner perimeter; where the outer perimeter of the rotor is configured such that the air gap between the outer perimeter of the rotor and the inner perimeter of the stator is non-uniform.

In some embodiments, a q-axis extends perpendicularly from the axis of rotation through a midpoint between two adjacent PM bulks, a d-axis extends perpendicularly from the axis of rotation through a midpoint of a PM bulk, and the air gap along the q-axis is between 150 and 250 percent of the air gap along the d-axis. In some embodiments, the air gap along the q-axis is between 190 and 210 percent of the air gap along the d-axis.

Some embodiments of the present PM rotors comprise: a rotor core having an axis of rotation; and a plurality of PM bulks internally coupled to the rotor core; where the rotor is configured such that the air gap-flux density distribution curve of the rotor is substantially sinusoidal. In some embodiments, the rotor is configured such that the air gap-flux density distribution curve is substantially sinusoidal under load. In some embodiments, the substantially sinusoidal air gap-flux density distribution curve has a periodic maxima and periodic minima, the periodic maxima do not deviate by more than five percent from the maximum of the sinusoidal fundamental component of air gap-flux density, and the periodic minima do not deviate by more than five percent from the maximum of the sinusoidal fundamental component of air gap-flux density.

Any embodiment of any of the present methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DESCRIPTION OF ILLUSTRATIVE EMBODIMENTS

The term "coupled" is defined as connected, although not necessarily directly, and not necessarily mechanically; two items that are "coupled" may be integral with each other. The terms "a" and "an" are defined as one or more unless this disclosure explicitly requires otherwise. The terms "substantially," "approximately," and "about" are defined as largely but not necessarily wholly what is specified, as understood by a person of ordinary skill in the art.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a device or system that that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps. For example, in a rotor that comprises a rotor core having an axis of rotation; and a plurality of PM bulks internally coupled to the rotor core, the rotor includes the specified elements but is not limited to having only those elements. For example, such a rotor could also non-magnetic flux barriers between adjacent PM bulks.

Further, a device or structure that is configured in a certain way is configured in at least that way, but it can also be configured in other ways than those specifically described.

Figure 1:
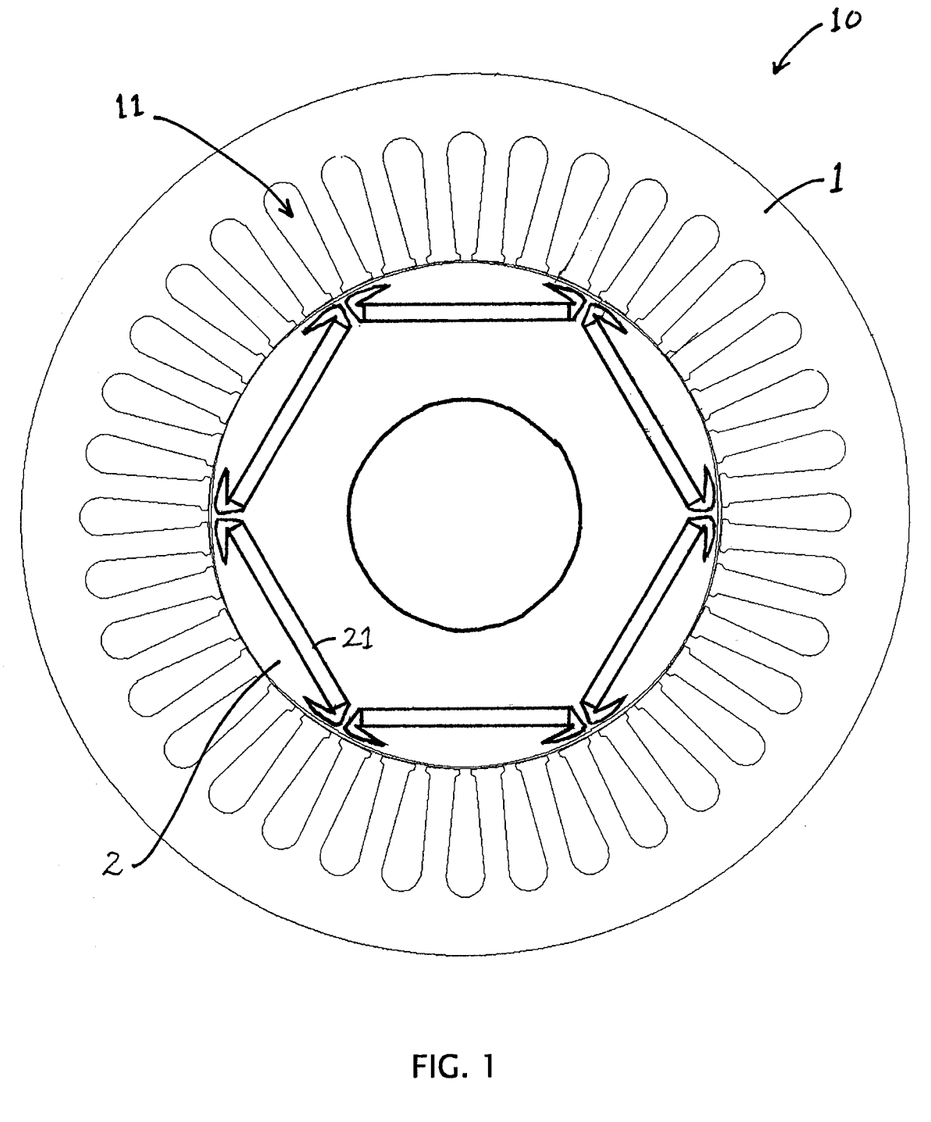
FIG. 1 depicts side view of one of the present a permanent magnet (PM)-rotor machines.
Figure 2:
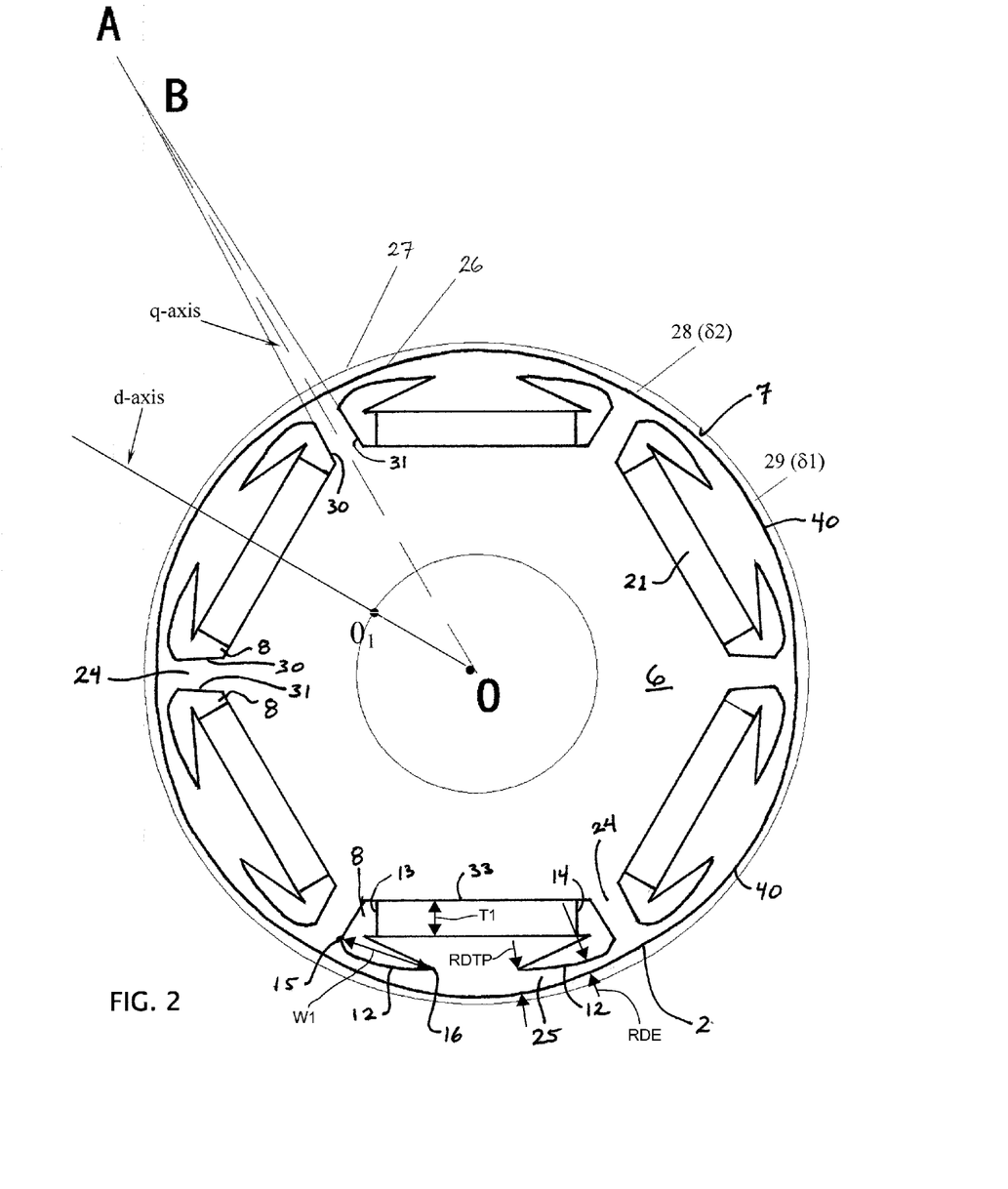
FIG. 2 depicts a side view of an embodiment of one of the present PM rotors that is suitable for use with the PM-rotor machine of FIG. 1.

Referring now to the drawings, and more particularly to FIGS. 1 and 2, an embodiment of the present PM rotor machines is designated by the reference numeral 10. PM rotor machine 10 may be interchangeably referred to in this disclosure as machine 10. More particularly, machine 10 is a rotating machine comprising a stator 1 and a rotor 2 configured to rotate relative to stator 1. In the embodiment shown, stator 1 has an inner perimeter or bore 27 and comprises a plurality of slots 11 (e.g., such as is known in the art for windings). Stator 1 can comprise magnetic laminations (e.g., laminated layers of magnetic material). Rotor 2 has an axis of rotation 0 and an outer perimeter 26. Rotor 2 need not actually rotate to define axis of rotation 0. Rather, axis of rotation 0 is the axis about which rotor 2 would rotate if put into operation (e.g., in an electrical motor or other machine). More particularly, rotor 2 comprises a rotor core 6 and a plurality of PM bulks 21 internally coupled (coupled within outer perimeter 26) to rotor 2 at equiangular intervals around axis of rotation 0. As such, rotor 2 may be referred to as an inner PM (IPM) rotor. In the embodiment shown, rotor 2 comprises six PM bulks 21, but in other embodiments, can comprise any suitable number of PM bulks (e.g., four, five, seven, eight, nine, ten, or more).

Rotor core 6 can comprise magnetic laminations (e.g., laminated layers of magnetic material). Rotor core 6 can comprise any suitable material, such as, for example, metal, steel, stainless steel, aluminum, carbon fiber, alloys, composites, and/or any other suitably durable and/or suitably rigid materials. PM bulks 21 can comprise any suitable PM material, such as, for example, NdFeB. NdFeB, for example, has a high magnetic energy, large remanence in the Bromine (Br,), large coercive force Hc, and working temperature can reach 180° C. As such, with NdFeB, less magnet material can be used to get enough magnetic energy, and the size of the machine can be reduced to achieve a machine with high energy density, as compared to certain other conventional materials.

In the embodiment shown, outer perimeter 26 of the rotor is configured such that air gap 7 between outer perimeter 26 of the rotor and inner perimeter 27 of the stator is non-uniform. As shown, a q-axis extends perpendicularly from axis of rotation 0 through a midpoint between two adjacent PM bulks 21 (e.g., is equidistant from each of the two adjacent PM bulks). As also show, a d-axis extends perpendicularly from axis of rotation 0 through a midpoint of a PM bulk 21 (e.g., bisects a PM bulk). In the embodiment shown having six PM bulks, the d-axis is disposed at a thirty degree angle relative to the q-axis. Although only one q-axis and one d-axis are shown, additional q-axes extend between each pair of adjacent PM bulks 21, and additional d-axes bisect each PM bulk 21. In the embodiment shown, the air gap along the q-axis (e.g., at point 28) is between 150 and 250 percent of the air gap along the d-axis (e.g., at point 29). For example, the air gap along the q-axis can be any suitable value relative to the air gap along the d-axis (e.g., the air gap along the q-axis can be equal to, greater than, less than, or between any of: 100, 110, 120, 130, 140, 150, 160, 170, 180, 190, 200, 210, 220, 230, 240, and/or 250 percent or more of the air gap along the d-axis). For example, in some embodiments the air gap along the q-axis is between 190 and 210 percent (e.g., 200 percent) of the air gap along the d-axis.

In the embodiment shown, outer perimeter 26 is not perfectly circular. More particularly, outer perimeter 26 is configured such that air gap $\delta 2$ along the q-axes is (e.g., at point 28) is larger than air gap $\delta 1$ along the d-axes (e.g., at point 29). In the embodiment shown, outer perimeter 26 transitions (e.g., curves) between the larger and smaller air gaps. More particularly, in the embodiment shown, outer perimeter 26 comprises convex portions (e.g., arcs) 40 (centered on the d-axes and corresponding to air gap $\delta 1$ along the d-axes). In the embodiment shown, arcs 40 have a radius extending from a point on their respective d-axis (e.g., point $0_1$) that is offset from axis of rotation 0. In some embodiments, arcs 40 intersect and connect at the q-axes such that the respective ends of adjacent arcs 40 are tangential (e.g., parallel) to one another at a point corresponding to air gap $\delta 2$ along the q-axes. In some embodiments, arcs 40 intersect and connect at the q-axes such that the respective ends of adjacent arcs 40 form a point corresponding to air gap $\delta 2$ along the q-axes. In other embodiments, adjacent arcs 40 can be filleted or otherwise smoothly transitioned between one another. In one example, the air gaps $\delta 1$ and $\delta 2$ can be determined and/or set, and the profile of outer perimeter 26 can be generated or determined by fitting a smooth curve to the air gaps.

In the embodiment shown, rotor core 6 defines a plurality of openings 8 through at least a portion of the rotor core (e.g., through the entire rotor core in a direction parallel to axis of rotation 0); and PM bulks 21 are internally coupled to the rotor core such that each PM bulk 21 is disposed within a different one of openings 8. In the embodiment shown, the PM bulks are rectangular in shape with a width (long dimension shown perpendicular to the respective d-axis), a thickness (short dimension shown), and a depth or length (parallel to the axis of rotation of the rotor). Further, in the embodiment shown, openings 8 are configured to include non-magnetic flux barriers 12 at opposing ends (e.g., 13 and 14) of each PM bulk 21. In the embodiment shown flux barriers 12 comprise open space (e.g., are void of material). However, in other embodiments, flux barriers 12 can comprise (e.g., can be filled, can receive, and/or can be coupled to) a non-magnetic material, such as, for example, non-magnetic stainless steel. In the embodiment shown, the open space has a width W1 (e.g., between points 15 and 16) that is larger than the thickness T1 of the PM bulk. More particularly, in the embodiment shown, the open spaces each extend around an opposing end (e.g., 13, 14) of a PM bulk 21 to terminate (e.g., at a termination point 16) between the PM bulk and outer perimeter 26 of the rotor core (e.g., at a point on an axis extending perpendicularly from the axis of rotation through the PM bulk), such that the rotor core is configured to have a magnetic insulation bridge 25 between the open space and outer perimeter 26. More particularly, the open spaces (flux barriers) extend around the end of the PM bulk (e.g., end 14) such that the radial distance from the flux barrier to the outer perimeter is greater at the termination point (e.g., 16—the RDTP) than is the radial distance from the flux barrier to the outer perimeter at the end (e.g., 14—the RDE) of the PM bulk.

In the embodiment shown, rotor core 6 is configured to have a plurality of magnetic insulation bridges 24 each disposed between adjacent openings 8, and each bridge 24 has a pair of non-parallel opposing sides 30 and 31 that partially define the adjacent openings. As shown, each magnetic insulation bridge 24 extends from adjacent PM bulks 21 (e.g., from an end 13, 14 and/or from an inner boundary 33 of the PM bulk) outward to outer perimeter 26. Bridges 24 and/or 25 are configured such that in operation of the rotor 2, the bridges may have high magnetic saturation (e.g, what may be referred to in the art as super-high magnetic saturation). In the embodiment shown, opposing sides 30 and 31 are angled such that if projected, as indicated, they would intersect at a point that is outside outer perimeter 26 of the rotor (and of rotor core 6). In the embodiment shown, if projected opposing sides 30 and 31 would intersect at a point A on the q-axis.

Figure 3:
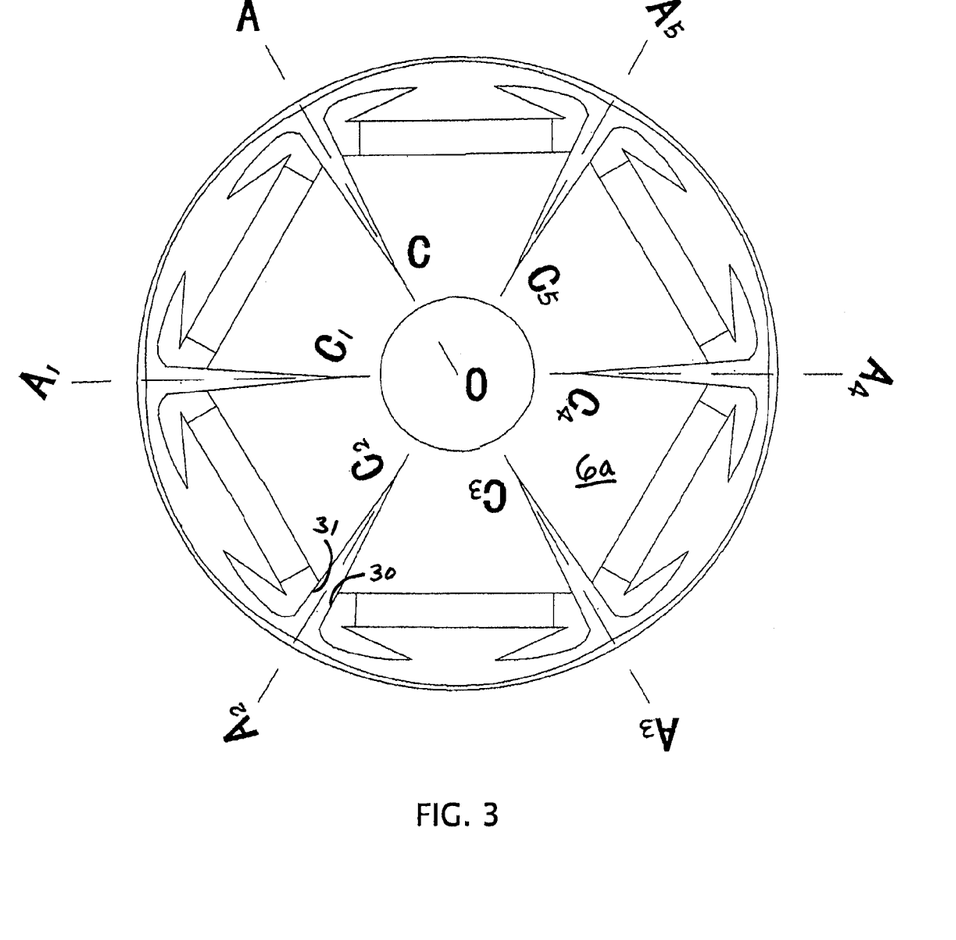
FIG. 3 depicts a side view of another embodiment of one of the present PM rotors that is suitable for use with the PM rotor machine of FIG. 1.

Referring now to FIG. 3, another embodiment is shown of a rotor core 6a. Rotor core 6a is substantially similar to rotor core 6 of FIG. 2, with one primary difference. Rotor core 6a is configured such that non-parallel opposing sides 30 and 31 are angled such that if projected, as indicated, they would intersect at a point that is inside outer perimeter 26 of the rotor (and of rotor core 6a). In the embodiment shown, if projected opposing sides 30 and 31 would intersect at a point C (e.g., C, $C_1, C_2, \ldots C_5$) on the q-axis.

Figure 4:
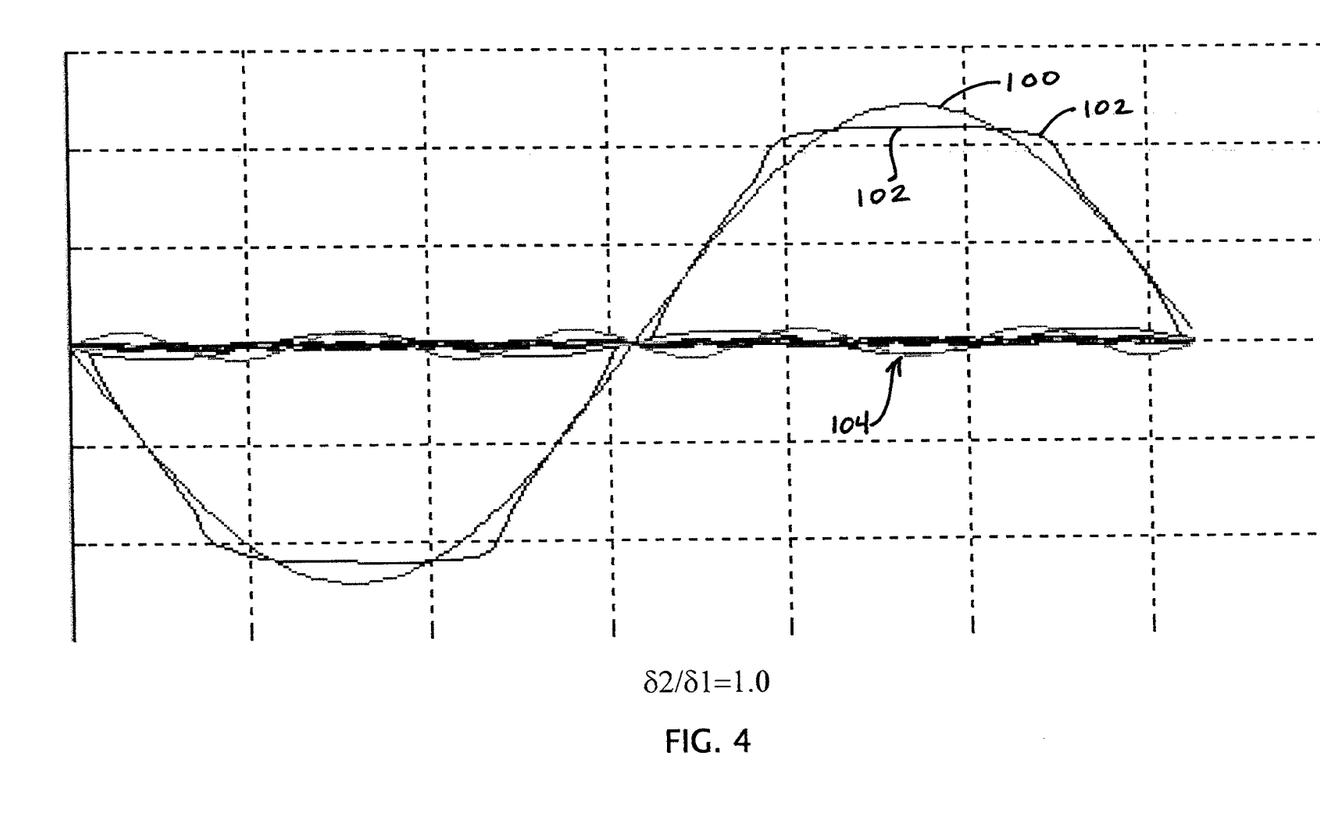
FIGS. 4-6 depict air gap-flux density distribution curves for various embodiments of the PM-rotor machine of FIG. 1.
Figure 5:
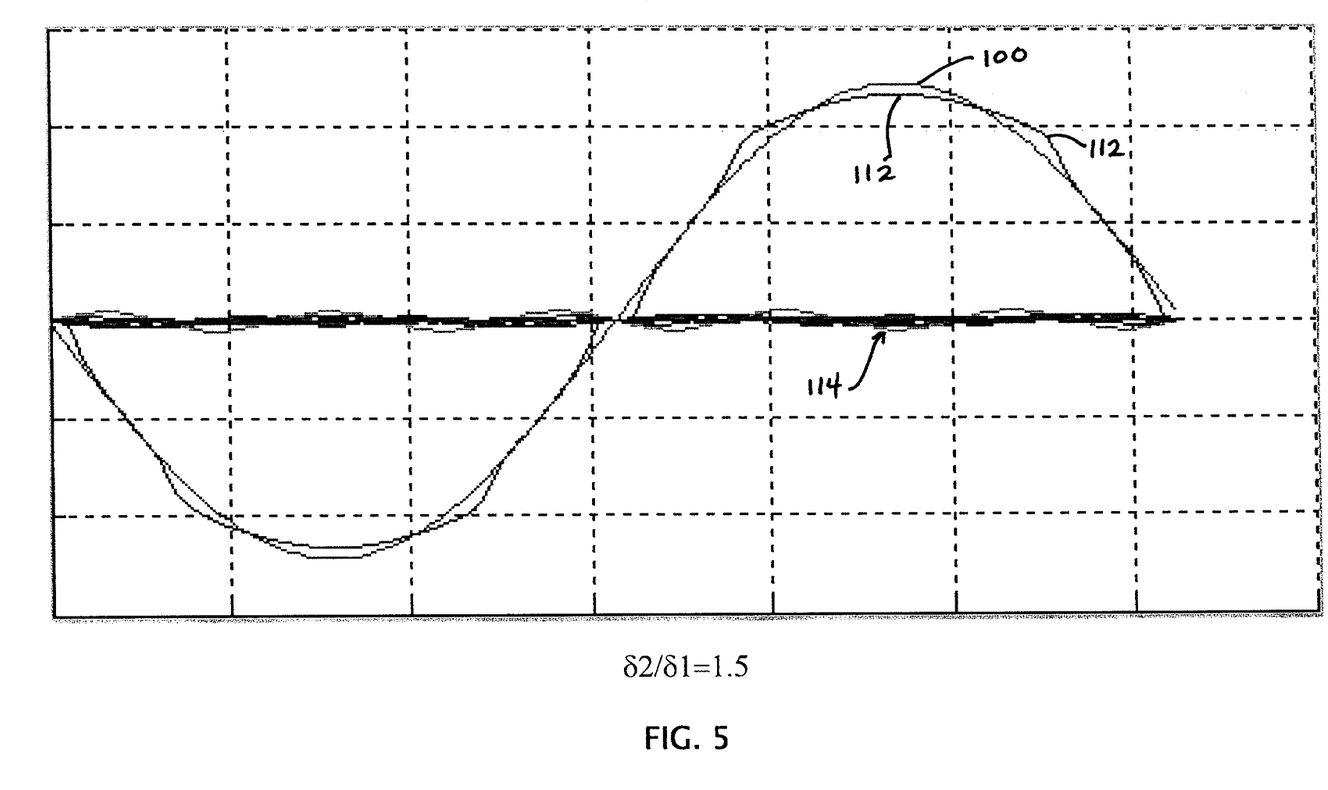
Figure 6:
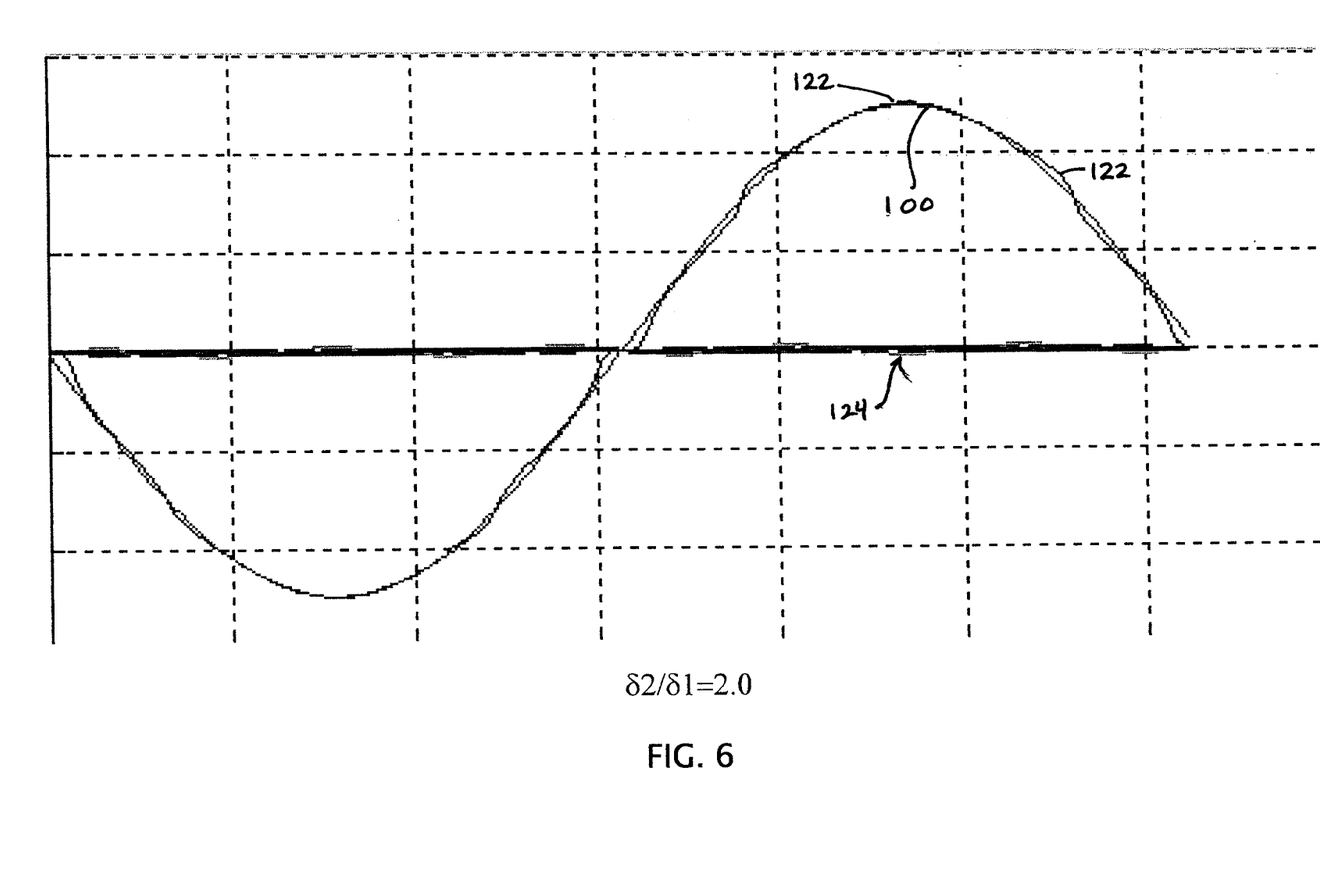

In some embodiments, the present rotors 2 can be configured such that the air gap-flux density distribution curve of the rotor is substantially sinusoidal (e.g., under load). For example, for the embodiment depicted in FIG. 2, computerized finite-element analysis (FEA) was performed to model the air gap-flux density distribution curve of the rotor 2. Fast Fourier Transform (FFT) harmonics analyses were also performed to model the harmonics of the respective rotor. As shown in FIGS. 4-6, the ratio of air gap $\delta 2$ to $\delta 1$ (air-gap ratio $\delta 2/\delta 1$) can affect the air gap-flux density distribution curve. In each of FIGS. 4-6, curve 100 depicts the sinusoidal fundamental component of air gap flux density. In FIG. 4, curve 102 depicts the modeled air gap-flux density waveform, and curves 104 depict the modeled third-order and higher-order harmonics of air gap flux density, for an air-gap ratio $\delta2/\delta1=1.0$. In FIG. 5, curve 112 depicts the modeled air gap-flux density waveform, and curves 114 depict the modeled third-order and higher-order harmonics of air gap flux density, for an air-gap ratio $\delta2/\delta1=1.5$. In FIG. 6, curve 122 depicts the modeled air gap-flux density waveform, and curves 124 depict the modeled third-order and higher-order harmonics of air gap flux density, for an air-gap ratio $\delta2/\delta1=2.0$. As indicated, with an air-gap ratio $\delta2/\delta1$ of greater than 1.0 (e.g., 1.5, 2.0), the flux density harmonics in the air gap can be restrained, and thus, harmful torque and losses, electromagnetic noise, and vibration can be suppressed. In some embodiments of rotor 2, such as the embodiment modeled in FIG. 6, the substantially sinusoidal air gap-flux density distribution curve has a periodic maxima and periodic minima, the periodic maxima do not deviate by more than five percent from the maximum of the sinusoidal fundamental component of air gap-flux density, and the periodic minima do not deviate by more than five percent from the maximum of the sinusoidal fundamental component of air gap-flux density.

Various embodiments of the present PM-rotor machines can comprise various embodiments of the present PM rotors. Examples of PM-rotor machines include motors, generators, synchronous motors and/or generators, and the like.

The various illustrative embodiments of rotors and machines described herein are not intended to be limited to the particular forms disclosed. Rather, they include all modifications, equivalents, and alternatives falling within the scope of the claims.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. A permanent-magnet (PM) rotor comprising:
    a rotor core having an outer perimeter and an axis of rotation and defining a plurality of openings through at least a portion of the rotor core; and
    six or more PM bulks internally coupled to the rotor core at equiangular intervals around the axis of rotation such that each PM bulk is disposed within a different one of the openings, each PM bulk having a thickness;
    where the openings are configured to include open spaces at opposing ends of each PM bulk, the open spaces having a width that is larger than the thickness of the PM bulk and each open space extending around an opposing end of a PM bulk to terminate between the PM bulk and the outer perimeter of the rotor core; and
    where the rotor core is configured to have a plurality of magnetic insulation bridges each disposed between adjacent openings and each having a pair of non-parallel opposing sides that partially define adjacent openings, each magnetic insulation bridge having an outer portion and an inner portion that is: (i) wider than the outer portion and (ii) closer to the axis of rotation than the outer portion.

2. The rotor of claim 1, where the opposing sides of each magnetic insulation bridge are angled such that if projected they would intersect at a point outside the outer perimeter of the rotor core.

3. The rotor of claim 2, where if projected the opposing sides would intersect at a point on a q-axis that extends perpendicularly from the axis of rotation through a midpoint between two adjacent PM bulks.

4. The rotor of claim 1, where the opposing sides of each magnetic insulation bridge are angled such that if projected they would intersect at a point inside the outer perimeter of the rotor core.

5. The rotor of claim 4, where if projected the opposing sides would intersect at a point on a q-axis that extends perpendicularly from the axis of rotation through a midpoint between two adjacent PM bulks.

6. The rotor of claim 1, where the rotor is configured to be rotatably coupled to a stator having an inner perimeter such that the air gap between the outer perimeter of the rotor core and the inner perimeter of the stator is non-uniform.

7. The rotor of claim 6, where a q-axis extends perpendicularly from the axis of rotation through a midpoint between two adjacent PM bulks, where a d-axis extends perpendicularly from the axis of rotation through a midpoint of a PM bulk, and where the rotor is configured to be rotatably coupled to the stator such that the air gap along the q-axis is between 150 and 250 percent of the air gap along the d-axis.

8. The rotor of claim 7, where the rotor is configured to be rotatably coupled to the stator such that the air gap along the q-axis is between 190 and 210 percent of the air gap along the d-axis.

9. A permanent-magnet (PM) rotor comprising:
    a rotor core having an axis of rotation and an outer perimeter, the rotor core defining a plurality of openings between the axis of rotation and the outer perimeter; and
    six or more PM bulks internally coupled to the rotor core at equiangular intervals around the axis of rotation such that each PM bulk is disposed within a different one of the openings;
    where the openings are configured to include non-magnetic flux barriers at opposing ends of each PM bulk, the non-magnetic flux barriers each extending around an opposing end of a PM bulk to terminate at a point between the PM bulk and the outer perimeter of the rotor core such that a radial distance from the flux barrier to the outer perimeter that is measured along a line passing perpendicularly through the axis of rotation and extending through the termination point is greater than a radial distance from the flux barrier to the outer perimeter that is measured along a line passing perpendicularly through the axis of rotation and extending through the end of the PM bulk; and
    where the rotor core is configured to have a plurality of magnetic insulation bridges each disposed between adjacent openings and each having a pair of non-parallel opposing sides that partially define adjacent openings.

10. The rotor of claim 9, where the opposing sides of each magnetic insulation bridge are angled such that if projected they would intersect at a point outside the outer perimeter of the rotor core.

11. The rotor of claim 10, where if projected the opposing sides would intersect at a point on a q-axis that extends perpendicularly from the axis of rotation through a midpoint between two adjacent PM bulks.

12. The rotor of claim 9, where the opposing sides of each magnetic insulation bridge are angled such that if projected they would intersect at a point inside the outer perimeter of the rotor core.

13. The rotor of claim 12, where if projected the opposing sides would intersect at a point on a q-axis that extends perpendicularly from the axis of rotation through a midpoint between two adjacent PM bulks.

14. The rotor of claim 9, where the rotor is configured to be rotatably coupled to a stator having an inner perimeter such that the air gap between the outer perimeter of the rotor core and the inner perimeter of the stator is non-uniform.

15. The rotor of claim 14, where a q-axis extends perpendicularly from the axis of rotation through a midpoint between two adjacent PM bulks, where a d-axis extends perpendicularly from the axis of rotation through a midpoint of a PM bulk, and where the rotor is configured to be rotatably coupled to the stator such that the air gap along the q-axis is between 150 and 250 percent of the air gap along the d-axis.

16. The rotor of claim 15, where the rotor is configured to be rotatably coupled to the stator such that the air gap along the q-axis is between 190 and 210 percent of the air gap along the d-axis.

* * * * *

UNITED STATES PATENT AND TRADEMARK OFFICE
CERTIFICATE OF CORRECTION

PATENT NO. : 8,772,994 B2  
APPLICATION NO. : 12/550147  
DATED : July 8, 2014  
INVENTOR(S) : Xueqing Feng et al.

Page 1 of 1

It is certified that error appears in the above-identified patent and that said Letters Patent is hereby corrected as shown below:

On The Title Page, Item (30) Foreign Application Priority Data:

Delete "2008 2 016707 U" and replace with -- 200820163707.4 --.

Signed and Sealed this
Twentieth Day of January, 2015

Michelle K. Lee
*Deputy Director of the United States Patent and Trademark Office*